UNITED STATES PATENT OFFICE.

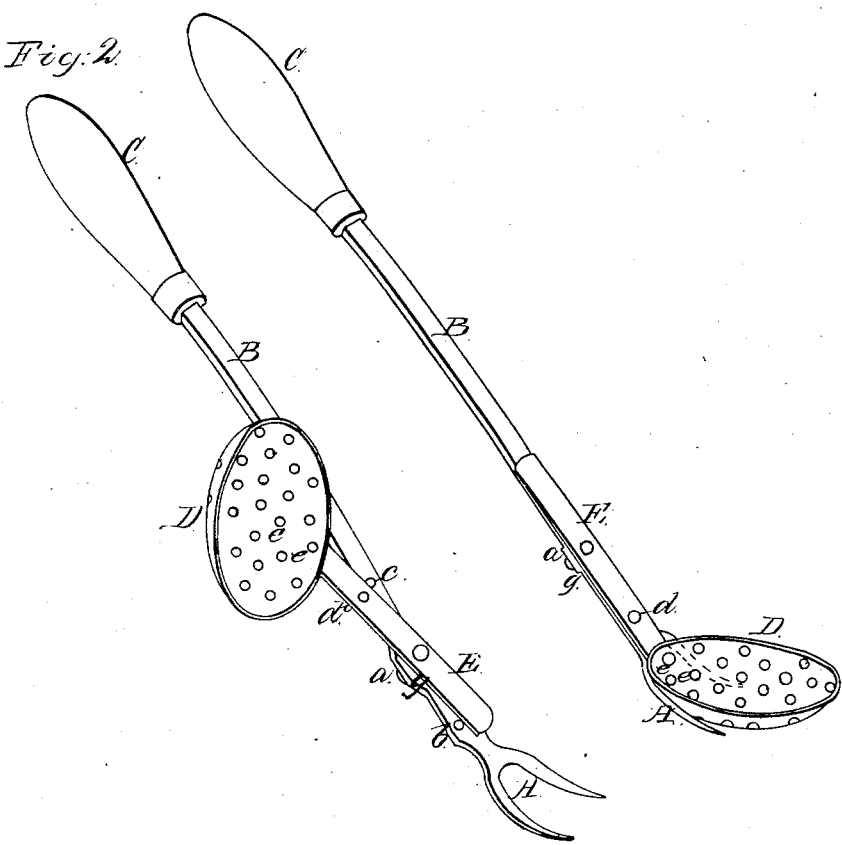

CHAS. B. BRISTOL, OF NAUGATUCK, CONNECTICUT.

FLESH-FORK AND SKIMMER.

Specification of Letters Patent No. 24,716, dated July 12, 1859.

*To all whom it may concern:*

Be it known that I, CHARLES B. BRISTOL, of the town or Naugatuck, in the county of New Haven and State of Connecticut, have invented a new and useful Improvement in Flesh-Forks and Skimmers, as an article of new manufacture; and I do hereby declare that the following is a full, clear, and exact description of the construction, character, and operation of the same, reference being had to the accompanying drawings, which make a part of this specification, in which—

Figure 1 is a perspective view of the article when used as a skimmer. Fig. 2 is a perspective view of the same, when the skimmer is turned aside, showing the tines, or prongs, of the flesh fork.

My improvement consists in the construction of an article in which is combined the flesh fork, and skimmer, (to be used in ordinary cooking, where either, or both, of these utensils are used,) by attaching the skimmer to the shank, or stale, of the fork, by a swivel, or joint pin, so that it may be turned down over the tines, or prongs, of the fork, when the skimmer is to be used, and turned up upon the stale, when it is desired to use the fork, thus changing, instantaneous, as it were, from one to the other, as may be needed.

I make the flesh fork of steel, or any other suitable material, with two, (or more,) prongs, or tines, as shown at A, Figs. 1, and 2, and a shank, or stale, B, substantially in the form shown in Fig. 2, with an expanded portion, as shown at $a$, Figs. 1 and 2, and two depressions, as indicated at $b$, and $c$, Fig. 2. And onto the end of the shank, or stale, I fit a suitable handle, as shown at C, (of wood, or other material).

I make the skimmer, D, of sheet brass, or any other suitable material, substantially in the form shown in the drawings, and attach it to a short elastic shank, E, by rivets, as seen at $e$, and $e$, or by any other convenient method. In this shank, E, I have a pin, or projecting point, as shown at $d$, Fig. 2, and indicated at $d$, Fig. 1. I attach this shank, E, to the stale, B, of the fork, by a joint pin, as shown at $g$, Figs. 1 and 2, on which, as a center, it freely revolves.

Having constructed, and attached the parts, as above described, if I wish to use the skimmer, D, I bring it to the position shown in Fig. 1, when the projection, shown at $d$, Fig. 2, by the elasticity of the shank, E, will be pressed into the cavity at $b$, Fig. 2, when the skimmer will be held firmly in the position shown in Fig. 1, and be ready for use. And if I wish to use the fork, A, I take hold of the skimmer, and raise the projection, $d$, out of the recess, $b$, and carry it around, on the joint pin, $g$, until the projection, $d$, falls into the recess, at $c$, Fig. 2, where the skimmer will be secured directly on a line with the stale of the fork, and the tines, or prongs, of the fork will be free, as shown in Fig. 2.

The advantages of my improvement consist, in that I can make the article, thus combined, at much less expense than the skimmer and fork can be made separately; and, in that it is much less trouble to change the position of the skimmer, than to lay down one and take up the other, (if both were at hand,) when they are made separately.

What I claim as my invention, and desire to secure by Letters Patent, as a new article of manufacture, is—

The combination of the fork, and skimmer, when constructed, attached, and fitted for use, substantially, as herein described.

CHAS. B. BRISTOL.

Witnesses:
GROSVENOR STARR,
R. FITZGERALD.